UNITED STATES PATENT OFFICE.

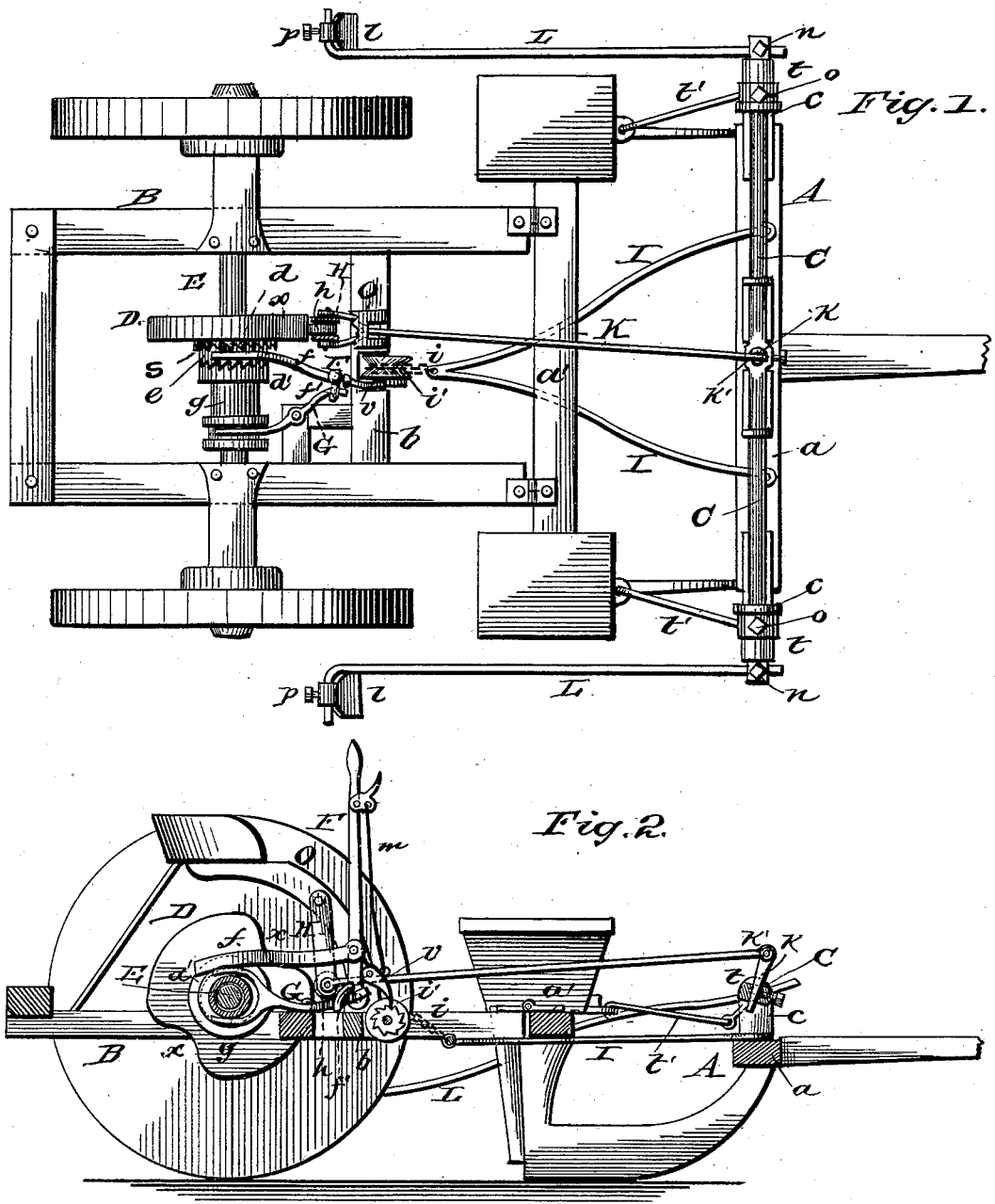

ARCHIBALD D. ADAMS, OF PROPHETSTOWN, ILLINOIS, ASSIGNOR OF THREE-FOURTHS TO JOHN J. GREENE, JOEL E. LOOMIS, AND HARRY F. KELLAM, ALL OF SAME PLACE.

CORN-PLANTER.

SPECIFICATION forming part of Letters Patent No. 296,906, dated April 15, 1884.

Application filed May 2, 1883. (No model.)

*To all whom it may concern:*

Be it known that I, ARCHIBALD D. ADAMS, a citizen of the United States, residing at Prophetstown, in the county of Whiteside and State of Illinois, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to that class of two-horse corn-planters whereby two rows are planted at the same time, and which is provided with the proper mechanism to avoid the necessity of more than one person (the driver) to operate it.

In the drawings, Figure 1 is a plan view, and Fig. 2 is a vertical longitudinal section of the same.

A and B are respectively the front and rear frames of a two-horse corn-planter. To the front cross-bar, $a$, of the front frame are attached the supports $e$, through which the transverse bar C passes, and in which said bar C oscillates. On each end of the bar C is placed a sleeve, $t$, which is held in any desired position by means of the set-screw $o$. Through the outer end of the sleeve $t$, and held therein by the set-screw $n$, passes the outwardly-curved rod L, the back end of which is bent at right angles to its length, and upon which right-angled part I place the hoe $l$, which, by means of the set-screw $p$, can be fastened to the rod L at any desired angle. To the bar C is also attached the jointed rod $t'$, which operates the dropping devices. Through the center of the bar C, I pass one end, $k$, of the rod K, which has the movable joint $k'$, and the other end of said rod K passes back over the center of the machine through a slot in the standard O, which supports the driver's seat. Such rod K is bifurcated at its rear end, and is in such bifurcation provided with the roller $h$, and is swung to the standard O by the parallel bars H. To the front cross-bar, $a$, are also attached the front ends of the rods I, which extend backward under the cross-bar $a'$ of the front frame, A, and come together in the lateral center of the machine at a point immediately in front of the cross-bar $b$ of the rear frame, B, where they are attached to a short chain, $i$, which passes up and over a pulley, $i'$, to which the other end of the chain $i$ is attached. The pulley $i'$ is provided on one of its edges with ratchet-teeth. The front frame, A, is also provided with ordinary furrow-openers and dropping devices.

Upon the rear frame, B, is mounted the axle E, which axle is revolved by the wheels in going forward, but which remains stationary in backing or turning. On the center of the axle E is the wheel D, two opposite sides of which are concaved, as shown at $x$, and which is at its center and around the axle E provided with the double ratchet S, composed of the parts $d$ and $e$, and the wheel D is free to move backward or forward independent of the axle E. On the axle E is also placed the sleeve $g$, which at all times revolves with the axle E, and which is provided with the ratchet-teeth $d'$, the latter being to engage the ratchet $e$ on the wheel D when the machine is in operation of planting, and which is thrown into gear by means of a spring within the sleeve $g$ and thrown out of gear by means of the lever G, which is made to encompass said sleeve. The lever G is pivoted at its center to the frame B, and the front end thereof is unconnected.

F is a lever to be operated by the driver, and is attached to the cross-bar $b$ of the frame B. Close to the point of attachment to the frame B the lever F is provided with the bent downwardly-projecting wedge-shaped lug, $f'$; and pivoted to the lever F, as shown, is the arm $f$, provided with a hook at its loose end to engage the ratchets $d$ on the wheel D. The lever F is also furnished with the pawl $v$, operated by the driver by means of the pawl-lever $m$, which said pawl is intended, in operation, to engage the ratchet-teeth in the pulley $i'$.

The principal object of my invention is to dispense with the help of one operator, (the dropper,) and to automatically drop the corn in check-rows.

In operation the machine is set with the roller $h$ on the rod K in either of the concave recesses in the wheel D. As the machine advances, the wheel $h$ traverses the periphery of the wheel D, and is thereby swung forward, which forward movement acts upon the bar C to raise the hoes $l$ out of the ground, and at the same time to draw the rod $t'$, which acts upon the seeding device, forward. When the roller $h$ reaches the opposite concavity of the wheel D, it swings immediately into such concavity, and the hoes $l$ come down with sufficient force to dig a hole in the ground at a point directly in line with the dropped corn, the corn being dropped by means of the rod $t'$ simultaneously with the descent of the hoes $l$. The stroke of the hoes can be regulated by moving the part $k$ of the rod K up or down in the cross-bar C. The driver, by watching the operation of the hoes, can at once see whether they are going to strike directly in line with the dropped corn, and if he discovers that the hoes are not going to strike quite quick enough to line with the dropped corn, he immediately moves the lever F forward, which causes the arm $b$ to engage the ratchet $d$ and bring the wheel D around to the place desired. If, on the other hand, the operator sees that the hoes will strike too quick, he can, by drawing the lever F toward him, cause the lug $f'$ to engage the loose end of the lever G, which acts upon the sleeve $g$ and draws it out of connection with the wheel D as long as desired, when, letting loose of the lever, the machine is again in operation. When the end of the row is reached and the driver desires to turn around, he, by means of the pawl-lever $m$, throws the pawl $v$ into contact with the ratchets on the pulley $i'$. Then, by drawing the lever toward him, he raises the rods I against the bar $a'$ of the frame A and raises the runners out of the ground. The same operation throws the machine out of gear.

What I claim as my invention, and desire to secure by Letters Patent of the United States, is—

1. The combination of the cam-wheel D, the roller $h$, journaled in the bifurcated arms H of lever K, the lever K, oscillating bar C, rods L, hoes $l$, rods $t'$, and the usual seed-slide, substantially as shown, and for the purpose described.

2. The combination of the branch arms I I, chain $i$, pulley $i'$, lever F, lug $f'$, arm $f$, and the wheel D, whereby the operation of the machine is suspended coincidently with the elevation of the furrow-openers or runners, substantially as shown, and for the purpose specified.

In testimony whereof I affix my signature in presence of two witnesses.

ARCHIBALD D. ADAMS.

Witnesses:
I. C. LOCKHART,
B. HUBBARD.